Patented Mar. 3, 1953

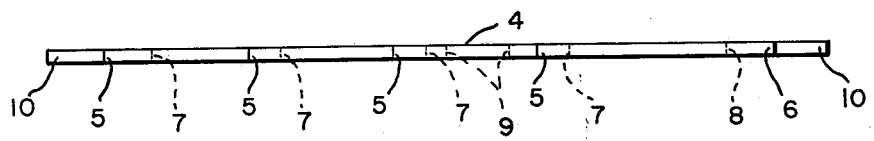
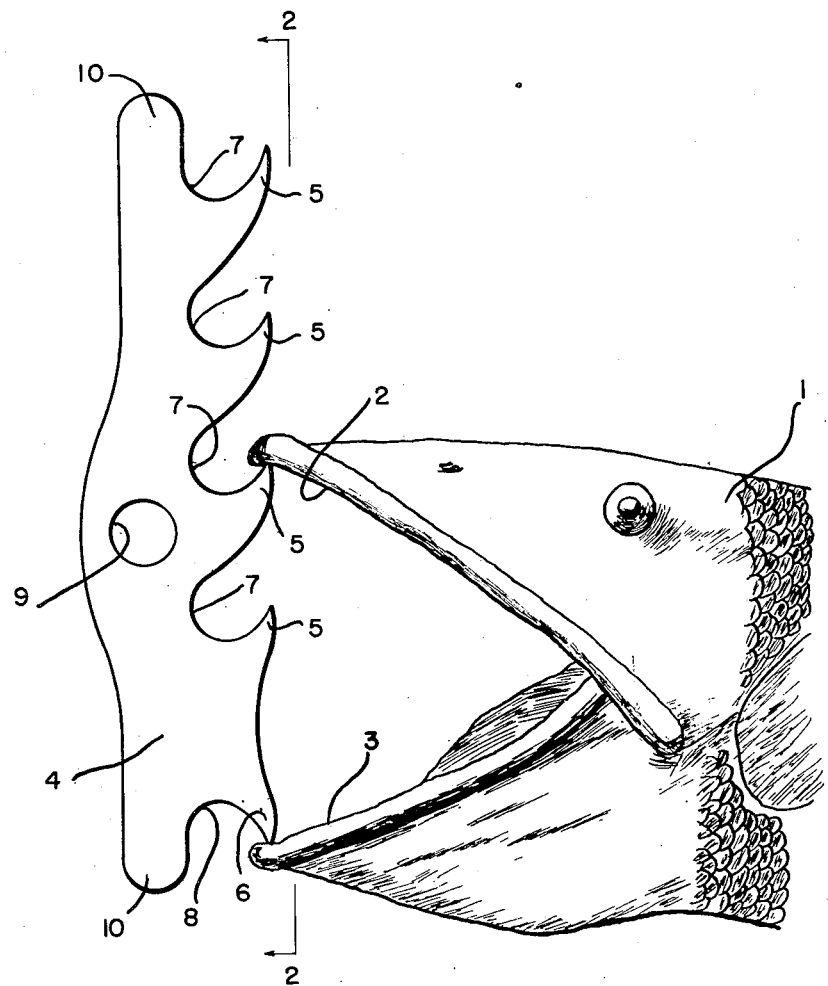

2,629,962

UNITED STATES PATENT OFFICE 2,629,962

FISHING DEVICE

Vermund J. Lambert, Proctor, Minn.

Application April 27, 1951, Serial No. 223,348

1 Claim. (Cl. 43—53.5)

This invention relates to an item of fishing tackle and has special reference to a device for holding the mouth of a fish open.

It is well known, among fishermen, that fish have teeth and that one may injure his hand or fingers very easily on these teeth when removing fishhooks from the fish's mouth. These teeth are very sharp and inflict a deep cut which is painful and which takes a long time to heal. This fact has been well recognized, as there are patented and on the market several devices for use in holding a fish's mouth open. However, the known devices are not satisfactory for various reasons. For example, many of them are too complicated to manufacture and sell at a reasonable price, many are too flimsy in their construction, others are too awkward to handle or operate, and others are too bulky and take up too much room in a tackle box.

It is, therefore, one of my principal objects to provide a device for holding the mouth of a fish open which is simple and inexpensive to manufacture.

Another object is to provide such a device which is convenient and easy to handle and operate.

Another object is to provide such a device which is sturdy in its construction and is thereby efficient in its operation.

Another object is to provide such a device which takes up a minimum of tackle box room and which is not subject to becoming tangled with other objects in the box.

Another more specific object is to provide a unitary flat article which may be stamped or molded in one operation, the device having a plurality of hook members in substantial alinement along one side thereof, and at least one of the hook members being disposed in the opposite direction to the other hook members to serve as the anchor member in operating the device.

These and other objects and advantages will become more apparent as the description of my invention proceeds.

In the accompanying drawing forming a part of this application:

Figure 1 is a side elevational view of my device showing how it is used to hold the mouth of a fish open.

Figure 2 is a view of one edge of my device from the line 2—2, Figure 1.

The reference numeral 1 indicates the head of a fish, and the numerals 2 and 3 indicate the upper and lower jaws of the fish's mouth. When a fish is caught, he bites on fish hooks, and often he takes such an enthusiastic bite on the hooks that they become engaged in the throat or other inner portion of the fish's mouth, and it is difficult to remove them with one hand while trying to hold the fish's mouth open and avoid contacting his teeth.

I have, therefore, provided a device for holding the jaws 2 and 3 apart so that both hands may be used in extracting the hooks safely. My device comprises a body member 4 which is preferably of one flat piece and may be of sheet metal, plastic, or the like. The body member has a plurality of spaced, hook-like projections 5 and 6 along one edge thereof, the projections 5—5 being disposed in one direction and the hook 6 being disposed in the opposite direction, as shown. The projections 5 and 6 are preferably in substantial alinement along the edge of the device, as shown, for neatness of appearance.

Intermediate the projections 5—5, the body 4 is cut out, as at 7—7, to form a throat between the projections to provide clearance space in which the edge or lips of the fish's jaw may be received when the jaw is engaged by or on one of the hooks or projections 5.

The hook or projection 6 is in the opposite direction to the hooks or projections 5, as stated, and forms the anchor member for the device. There is a cut-out or throat 8 inwardly from the hook 6 to provide clearance for the lower jaw to be received on the hook 6, as shown.

In operation, the device is grasped with one hand, the opening 9 providing a finger grip, while the other hand holds the fish. The anchor hook 6 is engaged in one of the jaws, either the upper or lower jaw, and pressure is exerted thereon to spread the jaws apart. The jaws will open readily, especially if the fish is squeezed at the gills, not shown, and then one of the hooks or projections 5 may be engaged on the other jaw, as shown, to hold them apart. The bigger the fish, the farther the jaws may be spread, thus the plurality of projections to permit selectivity as to jaw spacing according to fish size. Fish hooks may be readily removed when freedom of movement is provided as here shown.

In addition to the above, blunt projections 10—10 may be provided to extend beyond the projections 5 and 6 on each end of the device to prevent accidental injury to a person by contacting the projections 5 and 6, thereby providing for safety in handling and using the device.

The opening 9, besides providing a hand or finger grip, also permits a lanyard to be tied to the device to prevent its accidental loss by being dropped into the water.

It is deemed apparent that the device here shown and described may be stamped from flat sheet metal, such as aluminum, or the like, or it may be molded or stamped from suitable plastic material without departing from the spirit of my invention.

Having thus described my invention, I claim:

A device for holding the jaws of a fish in spaced relation comprising a body of a rigid material having greater length than width, one of the edges of the body being of less length than the opposite edge and having recesses along said edge, said recesses being defined by hook-shaped projections, each hook-shaped projection having a pointed end in one direction, and one end of the body having a hooked formation with a pointed end in a direction opposite to the pointed ends of the hook-shaped projections, the pointed ends of the projections being so spaced along the length of the rigid member that they, in cooperation with the hooked formation, are adapted to hold the jaws of fish of different sizes in spaced relation, the edge of the body opposite the edge having the hook-shaped projections being blunt to facilitate its use by the hand of an operator.

VERMUND J. LAMBERT.

REFERENCES CITED

The following references are of record in the file of this patent:

UNITED STATES PATENTS

| Number | Name | Date |
|---|---|---|
| 152,727 | Peterson | Feb. 15, 1849 |
| 527,235 | Carpi | Oct. 9, 1894 |
| 796,901 | Dool | Aug. 8, 1905 |
| 854,898 | Lorenz | May 28, 1907 |